United States Patent [19]
Briggs et al.

[11] Patent Number: 6,044,709
[45] Date of Patent: Apr. 4, 2000

[54] VIBRATOR

[75] Inventors: Mark W. Briggs, Holland; Joseph D. Wetzel, Hudsonville, both of Mich.

[73] Assignee: Venturedyne, Ltd., Milwaukee, Wis.

[21] Appl. No.: 09/182,019

[22] Filed: Oct. 29, 1998

[51] Int. Cl.[7] .................................................. G01M 7/02
[52] U.S. Cl. .............................................. 73/663; 73/665
[58] Field of Search .............................. 73/662, 663, 571, 73/665, 666, 667, 668; 411/178, 377; 403/260, 258, 320, 297

[56] References Cited

U.S. PATENT DOCUMENTS

| | | | |
|---|---|---|---|
| 2,955,573 | 10/1960 | Feucht | 121/32 |
| 3,382,772 | 5/1968 | Kampert et al. | 93/84 |
| 3,522,460 | 8/1970 | Spurlin | 73/662 |
| 3,704,651 | 12/1972 | Kupka | 91/232 |
| 4,037,821 | 7/1977 | Greene | 254/93 R |
| 4,441,644 | 4/1984 | Farian | 227/130 |
| 4,633,716 | 1/1987 | Martin | 73/663 |
| 4,715,229 | 12/1987 | Butts | 73/663 |
| 4,991,443 | 2/1991 | Fowler et al. | 73/663 |
| 5,229,554 | 7/1993 | Cole | 181/106 |
| 5,365,788 | 11/1994 | Hobbs | 73/665 |
| 5,437,339 | 8/1995 | Tanaka | 173/210 |

FOREIGN PATENT DOCUMENTS 403902   3/1974   Russian Federation .

Primary Examiner—Helen C. Kwok
Attorney, Agent, or Firm—Jansson, Shupe, Bridge & Munger, Ltd.

[57] ABSTRACT

A vibrator has (a) a housing including a wall forming a cavity, (b) a sleeve in the cavity, and (c) a piston received in the sleeve for reciprocating movement therein. In the improvement, the cavity has a boundary surface inside the housing and the vibrator includes an impact block interposed between the boundary surface and the sleeve. Such impact block is positionally retained in the cavity by the boundary surface and the sleeve.

16 Claims, 3 Drawing Sheets

6,044,709

VIBRATOR

FIELD OF THE INVENTION

This invention relates generally to measuring and testing and, more particularly, to such measuring and testing using a vibrator to "shake" a table supporting the apparatus being tested.

BACKGROUND OF THE INVENTION

Certain types of measuring and testing involve mounting the product to be tested upon a platform or table capable of limited movement in one or more axes of motion. The table is shaken or vibrated using a fluid vibrator, usually pneumatic as opposed to hydraulic, coupled to the table. An example of such an arrangement is disclosed in U.S. Pat. No. 5,365,788 (Hobbs) and involves a table vibrated by what the patent calls exciters.

Vibrators (or exciters) are available in a variety of configurations. Manufacturers of pneumatic vibrators include Cleveland Vibrator Co., Cleveland, Ohio, and Martin Engineering Co., Neponset, Ill. The Model VMS vibrator made by Cleveland Vibrator Co. includes a chrome-plated piston movable in a housing. At one end, the housing is closed by a bolted cap and the other end of the housing is open. The piston impacts directly against a channel mounting plate provided by the vibrator purchaser.

The PV Series piston vibrators made by Martin Engineering Co. include a chromed piston mounted for movement within an optional hollow cylindrical liner, the latter being stationary in the housing. The liner permits operating the vibrator without lubrication. The liner and piston are in a housing closed at one end by a bolted, flange-mounted cap and at the other end by a replaceable strike plate fitted into the housing. It is understood that the strike plate is against some sort of customer-supplied channel mounting plate.

While these prior art vibrators are understood to have been generally satisfactory for their intended purposes, they are not without disadvantages. One involves seeming lack of flexibility in mounting and use. As it is understood, the Cleveland and Martin vibrators are to be mounted directly against a mounting plate. Special arrangements are apparently needed if something is needed other than orthogonal mounting or mounting using a plate against the vibrator.

Another seeming disadvantage of prior art vibrators is that they require a good deal of machining over the course of manufacture. Of course, this adds incrementally to cost and, therefore, to selling price.

Yet another seeming disadvantage is that the designers of such vibrators have not fully appreciated how to make the vibrator more easily serviceable. Nor, seemingly, is there a full appreciation of how to enhance cooling of certain vibrator parts. (The latter is relevant because in operation, pneumatic vibrators become very hot.)

An improved pneumatic vibrator which addresses disadvantages of prior art vibrators would be an important advance in this field of technology.

OBJECTS OF THE INVENTION

It is an object of the invention to provide a pneumatic vibrator which addresses some of the problems and shortcomings of prior art vibrators.

Another object of the invention is to provide a pneumatic vibrator which affords a greater degree of mounting flexibility than certain types of known vibrators.

Another object of the invention is to provide a pneumatic vibrator which is easy to service, i.e., repair.

Yet another object of the invention is to provide a pneumatic vibrator which has enhanced cooling features.

Another object of the invention is to provide a pneumatic vibrator which obviates certain machining operations. How these and other objects are accomplished will become apparent from the following descriptions and from the drawings.

SUMMARY OF THE INVENTION

The invention involves a vibrator of the type having (a) a housing including a wall forming a cavity, (b) a sleeve in the cavity, and (c) a piston received in the sleeve for reciprocating movement within such sleeve. In the improvement, the cavity has a "floor" or boundary surface inside the housing. The vibrator includes an impact block interposed between the boundary surface and the sleeve and positionally retained in the cavity by the boundary surface and the sleeve.

In more specific aspects of the invention, the impact block includes a central portion having a first thickness and a perimeter portion having a second thickness less than the first thickness. In cross-section, the impact block may be said to be hat-shaped. The sleeve is around the central portion which extends a short distance into the sleeve. The perimeter portion is between the sleeve and the boundary surface. In a highly preferred embodiment, the sleeve and the central and perimeter portions of the impact block are circular and the perimeter portion is annular.

Further, the boundary surface is substantially planar and the impact block includes a substantially planar block surface against the boundary surface. The maximum dimension of the perimeter portion, measured in a direction normal to the housing central axis, is somewhat less than the maximum dimension of the cavity measured in the same fashion. And, measured in the same fashion, the maximum dimension of the central portion of the impact block is somewhat less than the inside dimension of the sleeve adjacent to such central portion. The resulting air-circulating spaces and the slightly increased overall surface area of the aforedescribed impact block (as compared to a plain disc-shaped block of uniform dimension) affords a degree of cooling not otherwise available or at least not as easily available.

In other aspects of the invention, the housing and the piston are made of metal, e.g., cast iron or aluminum, and the impact block is made of plastic. The sleeve has an exterior surface and an interior surface which is harder than the exterior surface. And the piston is coated with a lubricous material. Most preferably, such material is a polymer coating on the piston.

In yet other aspects of the invention, the vibrator wall has a terminus spaced from the boundary surface. A cap is affixed to the housing at the terminus and the sleeve is compressed between the cap and the impact block. To state it another way, the cap is bolted to the housing and the vibrator housing, sleeve and cap are configured and dimensioned in such a way that the cap compresses against the sleeve before the cap "bottoms out" on the terminus. Such construction helps assure that the sleeve and impact block are firmly secured in their respective locations in the housing cavity.

Other aspects of the invention involve the vibrator in combination with a shaker table. (The shaker table is so named because it is shaken or vibrated by the vibrator, usually several vibrators, to stress test equipment mounted atop the table.) The housing includes an angled nose member having a fastener, e.g., a bolt, affixing the housing and the table to one another. The fastener is spaced from the boundary surface and the housing extends in a continuum from the fastener to the boundary surface. That is, the material from which the housing is made is homogeneous between the fastener and the boundary surface. To put it in yet other terms, the housing is free of discontinuities, e.g., threads, voids or the like, between the fastener and the boundary surface. In a specific embodiment, the fastener is positioned so that it is intersected by the housing central axis.

Further details of the invention are set forth in the following detailed description and in the drawings.

BRIEF DESCRIPTIONS OF THE DRAWINGS

DETAILED DESCRIPTIONS OF PREFERRED EMBODIMENTS

Figure 1:
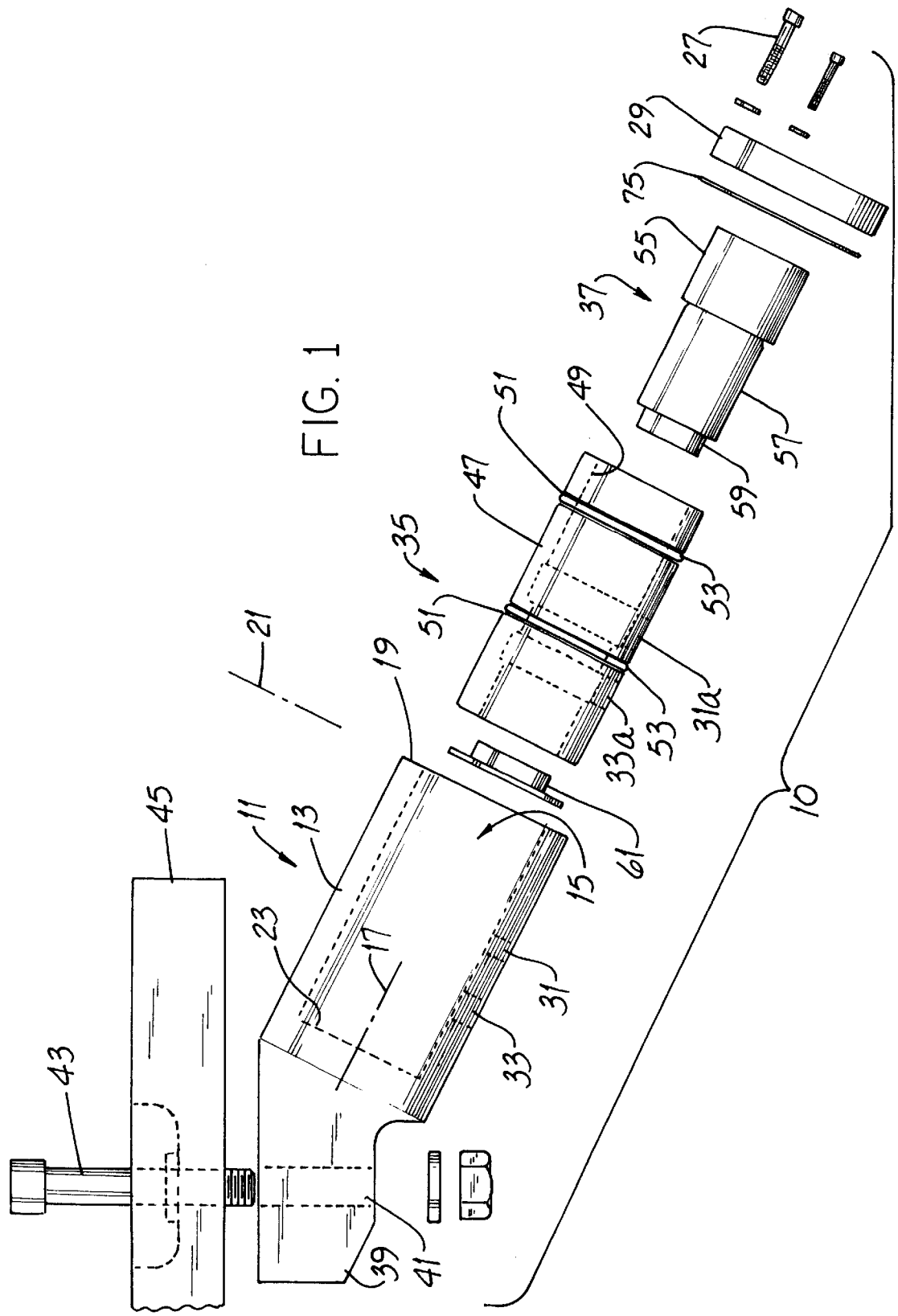
FIG. 1 is an exploded view of the new vibrator shown in conjunction with a vibrated table.

Referring to FIGS. 1–4, the new vibrator 10 has a housing 11 comprising a wall 13 of substantially uniform thickness and extending around and partially defining a cylindrical cavity 15. The cavity 15 is substantially concentric with the vibrator long axis 17. The wall 13 has a terminus 19 which, in a specific embodiment, is an annulus coincident with a plane 21 perpendicular to the axis. A substantially planar cavity floor or boundary surface 23 extends to the wall 13 and also partially defines the cavity 15.

Holes 25 for fasteners 27 are drilled or otherwise formed in the wall 13 in a direction parallel to the axis 17. As further described below, such holes 25 and fasteners 27 secure a cap 29 to the housing 11. Threaded inlet and exhaust ports 31 and 33, respectively, are radially formed in the wall 13. Most preferably, the housing 11 (as well as the sleeve 35 and the piston 37 described below) are made of metal, e.g., aluminum or cast iron.

The housing 11 also includes an angled nose member 39 (i.e., a member 39 angled with respect to the long axis 17) having a fastener aperture 41 through it. The aperture 41 and the fastener 43, e.g., a bolt, extending therethrough serve to affix the housing 11 and the table 45 to one another. When the vibrator 10 and the table 45 are assembled to one another, the axis 17 intersects both the aperture 41 and the fastener 43.

The fastener 43 is spaced from the boundary surface 23 and the housing 11 extends in a continuum from the fastener 43 to the boundary surface 23. That end of the cavity 15 delimited by the boundary surface 23 is permanently closed. That is, the material from which the housing 11 is made is homogeneous between the fastener 43 and the boundary surface 23. To put it in yet other terms, the housing 11 is free of discontinuities, e.g., threads, voids, caps, fittings, discs or the like, between the fastener 43 and the boundary surface 23.

A hollow, generally cylindrical sleeve 35 is received in the cavity 15 with sliding clearance between such sleeve 35 and the wall 13. The sleeve 35 has an exterior surface 47 toward the wall 13 and an interior surface 49 toward the piston 37. In a highly preferred embodiment, the interior surface 49 is harder than the exterior surface. In an exemplary embodiment, the hardness of the interior surface is in the range of 60–70 Rockwell C and the hardness of the exterior surface is about 150 Brinell using a 10 mm. ball with a 500 kg load.

Like the housing 11, the sleeve 35 also has inlet and exhaust ports 31a and 33a, respectively. As the vibrator 10 is assembled, the housing 11 and sleeve 35 are rotationally positioned so that the ports 31a, 33a of the sleeve 35 and the wall ports 31, 33 are respectively aligned with one another. And, of course, the axial spacing of the ports 31, 33 and the ports 31a, 33a is selected to permit such alignment. The sleeve 35 also includes a pair of circumferential O-ring grooves 51 and O-rings 53 seated therein so that the sleeve 35 and the wall 13 seal against one another.

The vibrator 10 also includes a piston 37 received in the sleeve 35 for reciprocating movement therewithin. The piston 37 has an enlarged body portion 55, a mid-portion 57 and an impact head 59 which are of progressively decreasing diameter. And the piston 37 is coated with a lubricous material, most preferably a polymer such as PTFE.

The vibrator 10 also includes an impact block 61 preferably made of a plastic material. Such block 61 is interposed between the boundary surface 23 and the sleeve 35 and positionally retained in the cavity 15 by the boundary surface 23 and the sleeve 35 in a manner described below. In a highly preferred embodiment, the impact block 61 is "hat shaped" in cross section (see FIG. 4) and includes a central portion 65 having a first thickness T1 and a rim-like perimeter portion 67 having a second thickness T2 less than the first thickness T1, both measured axially.

Figure 2:
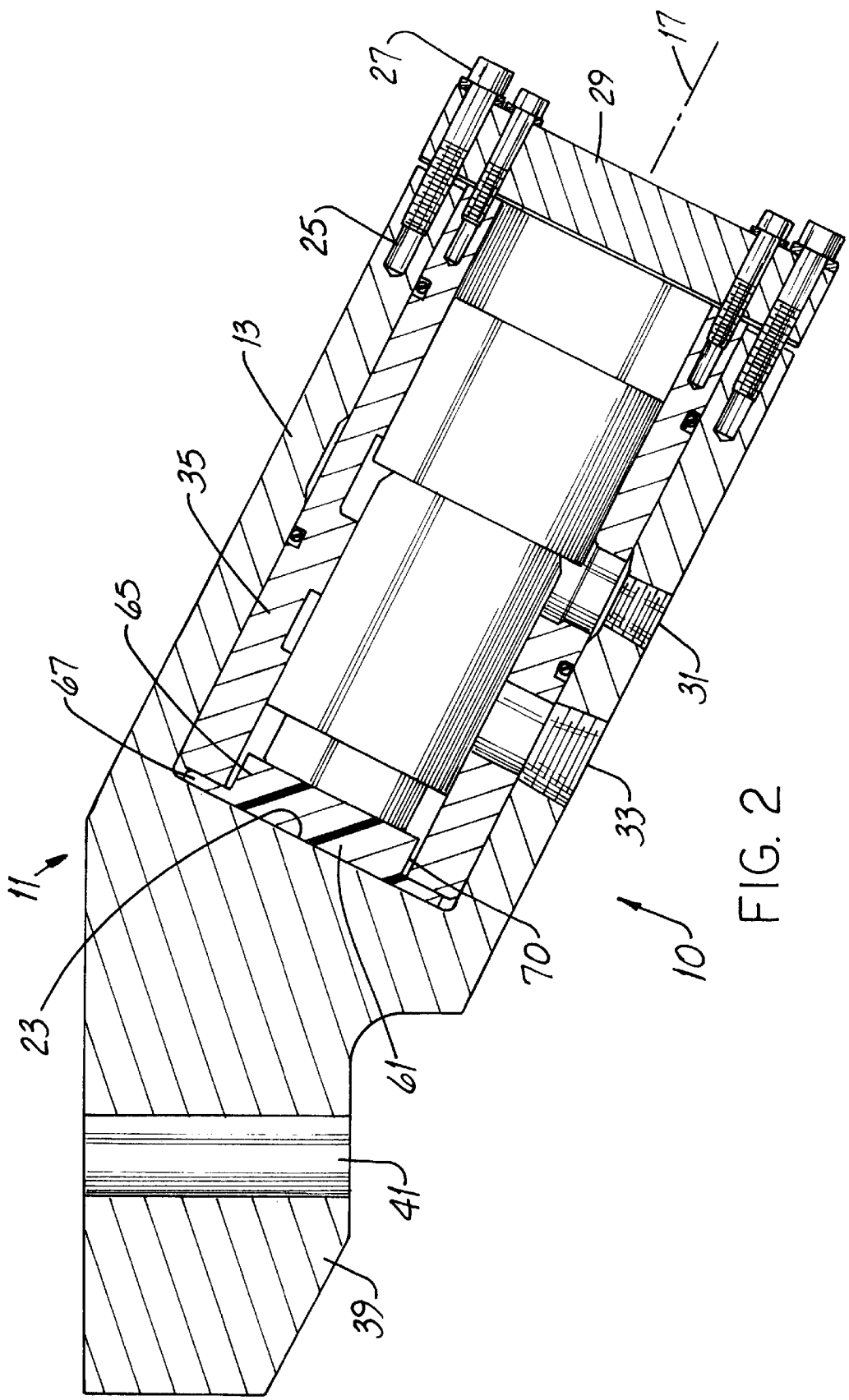
FIG. 2 is a longitudinal section view of the fully assembled vibrator.
Figure 3:
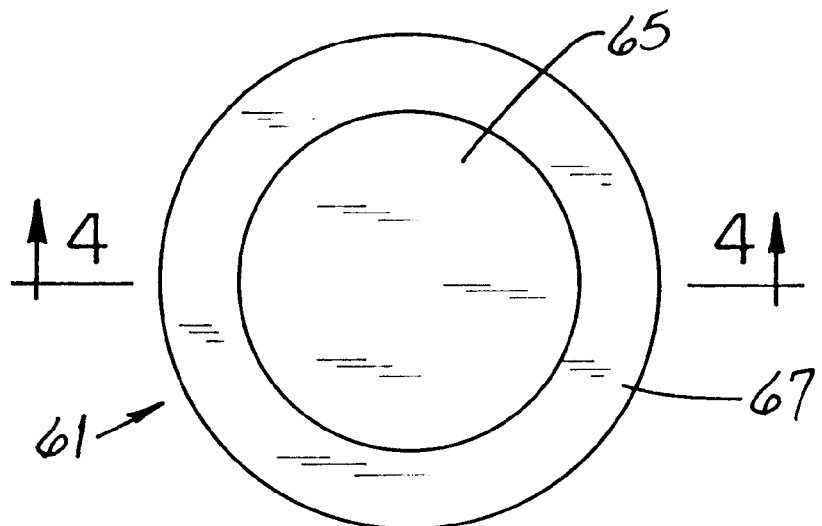
FIG. 3 is a plan view of the impact block used in the vibrator of FIGS. 1 and 2.
Figure 4:
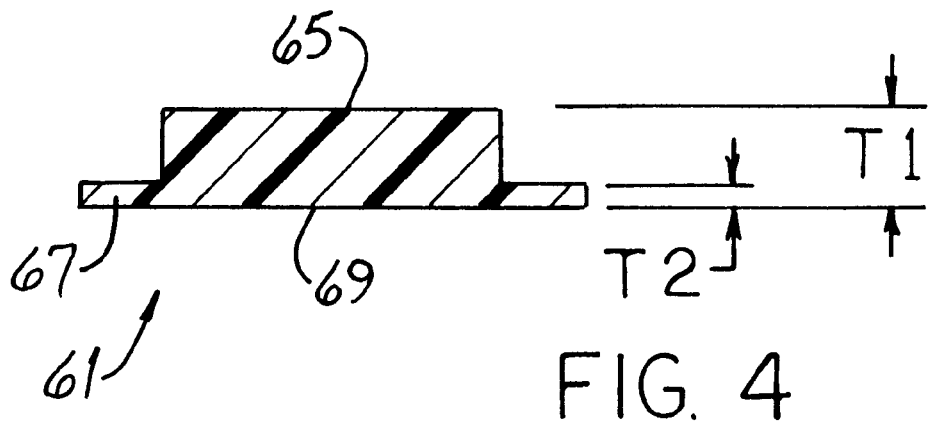
FIG. 4 is a section view of the impact block of FIG. 3 taken along the viewing plane 4—4 thereof.

When the vibrator 10 is assembled as shown in FIG. 2, the sleeve 35 is around the central portion 65 which extends a short distance into the sleeve 35. The perimeter portion 67 is between the sleeve 35 and the boundary surface 23. In a highly preferred embodiment, the sleeve 35 and the central and perimeter portions 65, 67 of the impact block 61 are circular and the perimeter portion 67 is annular.

The impact block includes a substantially planar block surface 69 against the boundary surface 23. As shown in FIG. 2, the maximum dimension of the perimeter portion 67, measured in a direction normal to the housing central axis 17, is less than the maximum dimension of the cavity 15 measured in the same fashion. And, measured in the same fashion, the maximum dimension of the central portion 65 of the impact block 61 is somewhat less than the inside dimension of the sleeve 35 adjacent to such central portion 65. The resulting air-circulating space 70 and the slightly increased overall surface area of the aforedescribed impact block 61 (as compared to a plain disc-shaped block of uniform dimension) affords a degree of cooling not otherwise available or at least not as easily available. But it should be clearly understood that a disc-shaped block is within the scope of the invention.

The vibrator 10 also includes a disc-like cap 29 affixed to the housing 11 at the terminus 19. The sleeve is compressed between the cap and the impact block. To state it another way, the cap 29 is bolted to the housing 11 and the vibrator housing 11, cavity 15, sleeve 35 and cap 29 are configured and dimensioned in such a way that the cap 29 compresses against the sleeve 35 before the cap 29 and its gasket 75 completely "bottom out" on the terminus 19. Considered in yet another way, the sleeve and the impact block are compressively secured in position between the cap and the boundary surface of the housing.

In operation, a product to be tested is mounted atop the table 45 and suitably secured there. One or, more likely, plural vibrators 10 are attached to the underside of the table in the manner indicated in U.S. Pat. No. 5,804,732 (Wetzel et al.) which is incorporated herein by reference. Compressed air is directed into the port 31 and as the piston 37 reciprocates, air is exhausted through the port 33. Porting, air "valving" and reciprocation occur in a known manner and need not be further described.

While the principles of the invention have been shown and described in connection with preferred embodiments, it is to be understood clearly that such embodiments are by way of example and are not limiting.

What is claimed:

1. In a vibrator having (a) a housing including a wall forming a cavity, (b) a sleeve in the cavity, and (c) a piston received in the sleeve for reciprocating movement therein, the improvement:

the cavity has a boundary surface inside the housing;

the vibrator includes an impact block interposed between the boundary surface and the sleeve, the sleeve engaging and positionally retaining the impact block in the cavity against the boundary surface; and the piston engageable with the impact block during the reciprocating movement thereof.

2. The vibrator of claim 1 wherein:

the impact block includes a central portion having a first thickness and a perimeter portion having a second thickness less than the first thickness.

3. The vibrator of claim 2 wherein:

the sleeve is around the central portion; and the perimeter portion is between the sleeve and the boundary surface.

4. The vibrator of claim 3 wherein:

the boundary surface is substantially planar;

the impact block includes a substantially planar block surface against the boundary surface.

5. The vibrator of claim 2 including an air-circulating space between the perimeter portion and the housing.

6. The vibrator of claim 1 wherein:

the housing and the piston are made of metal; and the impact block is made of plastic.

7. The vibrator of claim 1 wherein:

the sleeve has an exterior surface and an interior surface;

the interior surface is harder than the exterior surface; and the piston is coated with a lubricous material.

8. The vibrator of claim 7 wherein the lubricous material is a polymer coating on the piston.

9. The vibrator of claim 1 wherein:

the wall has a terminus spaced from the boundary surface;

a cap is affixed to the housing at the terminus; and the sleeve is compressed between the cap and the impact block.

10. The vibrator of claim 9 in combination with a shaker table, and wherein:

the housing includes a nose member having a fastener affixing the housing and the table to one another;

the fastener is spaced from the boundary surface; and the housing extends in a continuum from the fastener to the boundary surface.

11. The combination of claim 10 wherein:

the housing includes a central axis extending therealong; and the axis intersects the fastener.

12. A vibrator for shaking a table, comprising:

a housing having an inner wall defining a cavity therein, the housing including a first closed end;

an impact block positioned within the cavity in the housing and abutting the closed end of the housing;

a sleeve receivable within the cavity in the housing, the sleeve having a first end engaging the impact block and maintaining the impact block in abutment with the closed end of the housing and a second, opposite end; and a piston received in the sleeve for reciprocating movement therein, the piston engageable with the impact block during the reciprocating movement.

13. The vibrator of claim 12 wherein the impact block includes a generally cylindrical central portion and perimeter portion extending radially therefrom.

14. The vibrator of claim 13 wherein the central portion of the impact block extends into the sleeve and wherein the perimeter portion is captured between the closed end of the housing and the first end of the sleeve.

15. The vibrator of claim 14 wherein the perimeter portion of the housing and the closed end of the housing define an air-circulating space therebetween.

16. The vibrator of claim 12 wherein the housing includes a second, opposite end having a cap mounted thereto, the first end of the sleeve engaging the impact block and the second end of the sleeve engaging the cap.

\* \* \* \* \*